US008099083B2

(12) United States Patent
Ramachandran et al.

(10) Patent No.: US 8,099,083 B2
(45) Date of Patent: Jan. 17, 2012

(54) DISTRIBUTED FAULT-TOLERANT VOICE MESSAGE SYSTEM FOR INDEPENDENT MOBILE TELEPHONY NETWORKS

(75) Inventors: Sethuraman Ramachandran, Erie, CO (US); Jean-Francois Bergeron, Varennes (CA); Amy Derbyshire, Boulder, CO (US); Catherine Truchan, Lorraine (CA); Badis Omarouayache, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1186 days.

(21) Appl. No.: 11/839,865

(22) Filed: Aug. 16, 2007

(65) Prior Publication Data
US 2009/0047935 A1     Feb. 19, 2009

(51) Int. Cl.
*H04M 11/10*     (2006.01)
(52) U.S. Cl. .................................. 455/413; 455/412.1
(58) Field of Classification Search ........ 455/412.1–413
See application file for complete search history.

(56) References Cited

U.S. PATENT DOCUMENTS

| 6,282,416 B1 * | 8/2001 | Verdonk ....................... 455/413 |
| 6,577,712 B2 * | 6/2003 | Larsson et al. ............. 379/88.17 |
| 6,925,299 B1 * | 8/2005 | Sofer et al. ................. 455/414.2 |
| 6,950,876 B2 * | 9/2005 | Bright et al. ................... 709/230 |
| 2001/0036256 A1 | 11/2001 | Larsson et al. |
| 2005/0136895 A1 * | 6/2005 | Thenthiruperai et al. . 455/412.2 |

FOREIGN PATENT DOCUMENTS

| WO | WO 99/57914 A | 11/1999 |
| WO | WO 00/19692 A | 4/2000 |

OTHER PUBLICATIONS

Philip Nystromer: "Quiclink: A Portable 3G WCDMA Cellular Service, Deployed in Minutes" Presentation, Jun. 11, 2007, pp. 1-27.

* cited by examiner

*Primary Examiner* — Steven Lim
(74) *Attorney, Agent, or Firm* — Roger S. Burleigh

(57) ABSTRACT

A communications network and method for providing a voice message to a user of a mobile station (MS) in a network having a plurality of independent mobile systems, each independent mobile system including a Mobile Switching Center (MSC), Short Message Service Center (SMS-C) and Voice Message System (VMS), wherein each VMS is identified by a unique identifier code. A received voice message is stored in a VMS, and an SMS notification message is sent to the MS. Because each VMS is identified by a unique identifier code, the MS can retrieve a voice message by dialing the code contained in an SMS notification message, regardless of which independent mobile system is serving the MS at the time the voice message retrieval is requested.

18 Claims, 3 Drawing Sheets

DISTRIBUTED FAULT-TOLERANT VOICE MESSAGE SYSTEM FOR INDEPENDENT MOBILE TELEPHONY NETWORKS

TECHNICAL FIELD

The present invention is directed, in general, to communications systems and, more specifically, to apparatus and methods for providing voice message services to a user of a mobile terminal in a communications network having independent mobile telephony systems.

BACKGROUND

A voice message, or "voice mail," system (VMS) is typically implemented in a centralized server in commercial mobile telephony networks. In such networks, the network components, such as Mobile Switching Center (MSC), Short Message Service Center (SMS-C) and Radio Access Network (RAN) subsystems, are typically physically-connected to form a network that can cover vast geographical areas. For military, civil defense or disaster recovery operations, however, it is advantageous to deploy many portable, independent, "network-in-a-box," systems which each contain a RAN as well as the core network components. Such a scaled-down system, also referred to as a Compact System, is capable of providing service to mobile stations within its radio coverage area without being dependent on physical connectivity to any other telecommunications infrastructure; the system is completely self-contained and is capable of stand-alone operation.

In a deployment scenario with independent mobile systems that are either physically-mobile or are stationary but deployed in remote areas with intermittent satellite or microwave links, a centralized VMS may not be accessible all the time. Furthermore, if a centralized VMS is relied upon, it becomes a single-point of failure. Thus, in such scenarios, it would be advantageous to have a distributed VMS solution that can provide voice mail service to mobile stations even if the serving independent mobile system is operating in stand-alone mode. Accordingly, there is a need in the art for improved apparatus and methods for providing voice message services to a user of a mobile terminal in a communications network having independent mobile telephony systems. Preferably, such improved apparatus and methods will provide fault-tolerance to allow for continued VMS services throughout the communications network if a single VMS should fail.

SUMMARY

To address the above-discussed deficiencies of the prior art, disclosed are systems and methods for providing a voice message to a user of a mobile station (MS) in a communications network having at least first and second independent mobile systems. Each of the independent mobile systems includes a Mobile Switching Center (MSC), Short Message Service Center (SMS-C) and Voice Message System (VMS), In one embodiment, the MSC, SMS-C and VMS of each independent mobile system are physically co-located.

When a call request for a MS is received, the call request is routed to the MS through a MSC of an independent mobile system currently serving the MS. If the MS does not answer the call request, the calling party can leave a voice message in a VMS. The VMS then requests that a SMS-C transmit an SMS notification message to the MS. The SMS notification message includes the unique identifier code of the VMS of the independent mobile system in which the voice message is stored, whereby the MS can retrieve the voice message by placing a call to the unique identifier code of the VMS.

The MS can retrieve the voice message when being served by any independent mobile system. To do so, the MS sends a request for the voice message, which is received by the MSC of the independent mobile system currently serving the MS; the request is directed to the unique identifier code of the VMS which received the voice message. The request for the voice message is routed from the MSC of the independent mobile system currently serving the MS to the VMS storing the voice message, which can then cause the voice message to be transmitted to the MS. In one embodiment, the transmission of a voice message from a VMS to a MS includes transmitting the voice message to a Media Gateway (MGW) of the independent mobile system in which the message was stored, which then transmits the voice message to the MS through a MGW of the independent mobile system then serving the MS.

In one embodiment, a MS can retrieve a plurality of voice messages stored by a plurality of VMSs when being served by any independent mobile system. In such embodiments, the MS sends a request for all voice messages, which is received by the MSC of the independent mobile system currently serving the MS; the request is directed to a common identifier code for voice messages. The voice message request is routed from the MSC of the independent mobile system currently serving the MS to a VMS of that independent mobile system. That VMS then requests each individual voice message for the MS stored on each VMS of all independent mobile systems in the communications network. Each voice message is then transmitted to the MS. In one embodiment, each voice message is transmitted directly from the VMS storing it to the MS. In an alternate embodiment, each individual voice message is received at the VMS of the independent mobile system currently serving the MS. That VMS then transmits each individual voice message to a Media Gateway (MGW) of the independent mobile system currently serving the MS, which then transmits the voice message to the MS.

In one embodiment, each VMS includes an indexing service that identifies each voice message stored on each VMS of all independent mobile systems in the communications network. The indexing service can catalog each voice message for stored on each VMS of all independent mobile systems in the communications network by periodically polling each VMS or, alternatively, in response to automatically receiving updates from each VMS in the communication network.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the claims provided hereinafter.

BRIEF DESCRIPTION OF THE DRAWINGS

For a more complete understanding of the invention, reference is now made to the following detailed description taken in conjunction with the accompanying drawings, in which.

DETAILED DESCRIPTION

Figure 1:
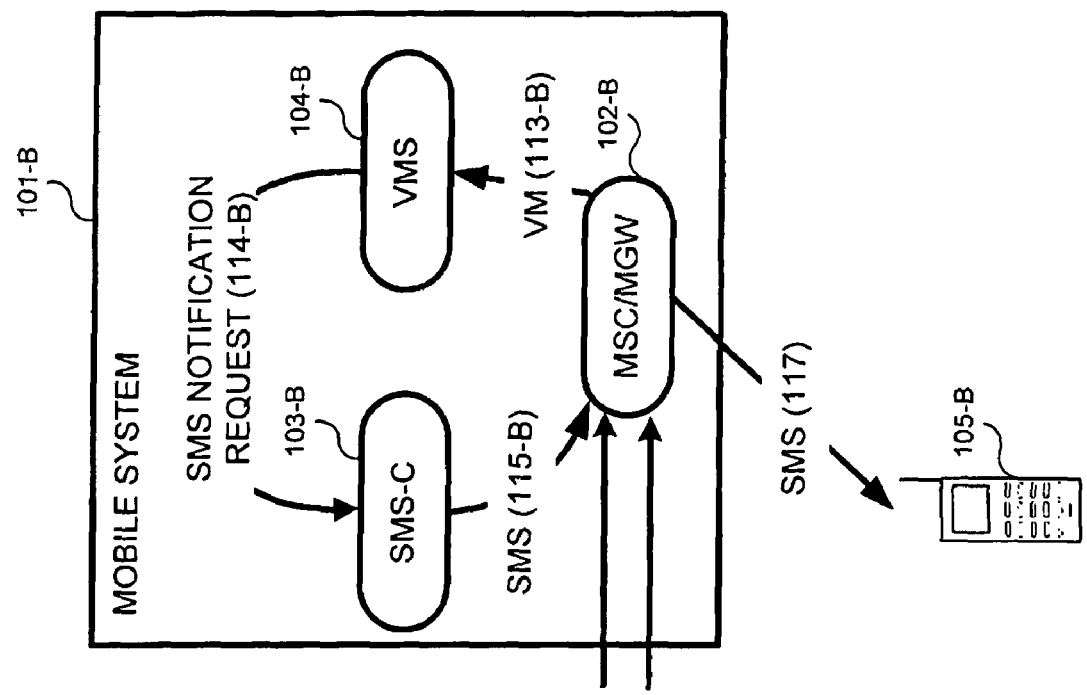
FIG. 1 illustrates the signalling related to the storing of a voice message, and notification thereof, according to the principles of the invention.
Figure 1:
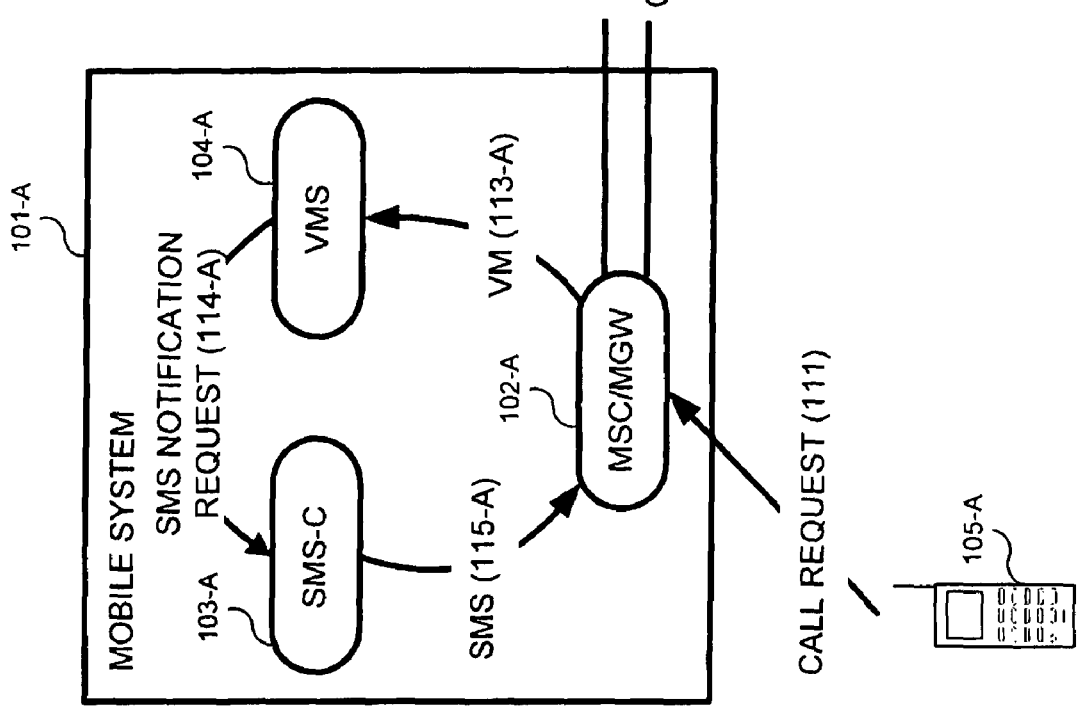

Referring to FIG. 1, illustrated is the signalling related to the storing of a voice message, and notification thereof to a mobile station (MS), in a communications network having at least first and second independent mobile systems (101-A, 101-B). Each of the independent mobile systems includes a Mobile Switching Center (MSC; 102-A, 102-B)), Short Message Service Center (SMS-C; 103-A, 103-B) and Voice Message System (VMS; 104-A, 104-B). The MSC, SMS-C and VMS of each independent mobile system can be physically co-located, such as in a compact system for mobile military applications.

When a call request 111 for a MS is received, for example from MS 105-A for MS 105-B, the call request 111 is routed to the MS 105-B through the MSC 102-B of the independent mobile system 101-B currently serving the MS 105-B. In the illustrated example, the call request 111 is first received by the MSC 102-A currently serving the calling MS 105-A. The MSC 102-A then routes the call request 112 to the MSC 102-B of the independent mobile system 101-B currently serving the called MS 105-B.

If the called MS 105-B does not answer the call request, or the MS 105-B is configured to automatically route calls to voicemail (e.g., unconditional call forwarding), the calling party can leave a voice message. In one embodiment, the voice message is stored in the VMS of the independent mobile system through which the call request is received. For example, in FIG. 1, the call request 111 is received at MSC 102-A of independent mobile system 101-A. When MS 105-B does not answer the call request, the calling party is directed to leave a voice message 113-A in VMS 104-A. The VMS 104-A then requests 114-A that a SMS-C 103-A of the independent mobile system 101-A transmit an SMS notification message 115-A to the MS 105-B; the SMS notification message 115-A is routed (116) by MSC 102-A to MSC 102-B then serving the called MS 105-B, and then routed (117) from the MSC 102-B to the MS 105-B. In an alternate embodiment, the voice message is stored in the VMS 104-B of the independent mobile system 101-B currently serving the MS 105-B. In this embodiment, The VMS 104-B then requests 114-B that a SMS-C 103-B of the independent mobile system 101-B transmit an SMS notification message 115-B to the MS 105-B. As illustrated in FIG. 1, the SMS notification message is first routed (115) from the SMS-C 103-B to the MSC 102-B (115), and then routed (117) from the MSC 102-B to the MS 105-B. In both embodiments, the SMS notification message includes a unique identifier code of the VMS where the message is stored, whereby the MS 105-B can retrieve the voice message by placing a call to the unique identifier code of the VMS, regardless of which independent mobile system is serving the MS 105-B at the time of requesting the voice message; this capability is illustrated in FIG. 2.

Figure 2:
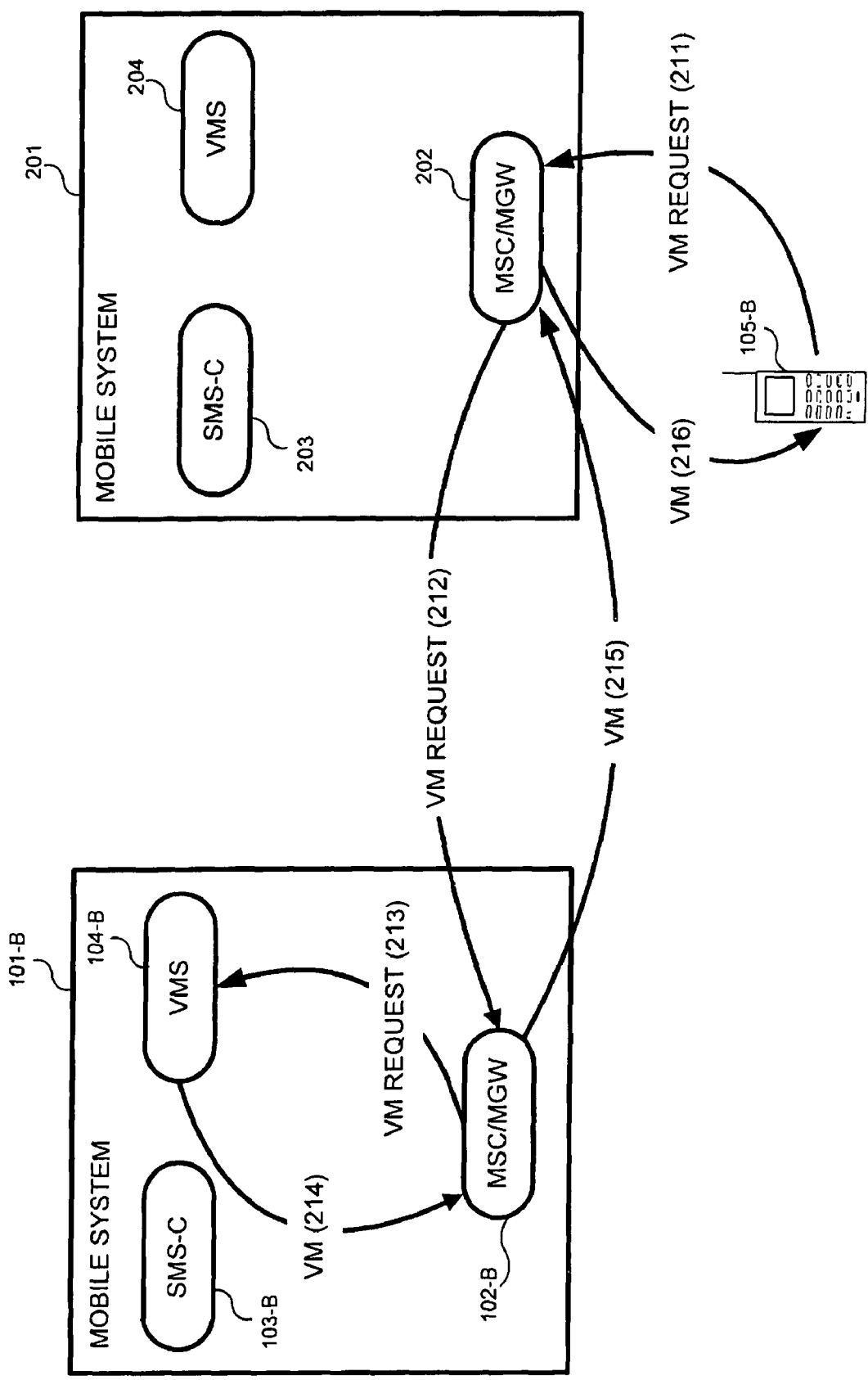
FIG. 2 illustrates first exemplary signalling related to the retrieval of a voice message, according to the principles of the invention; and, FIG. 3 illustrates second exemplary signalling related to the retrieval of a voice message, according to the principles of the invention.

Turning now to FIG. 2, illustrated is first exemplary signalling related to the retrieval of a voice message by a MS when being served by any independent mobile system. As illustrated in FIG. 1, a voice message for MS 105-B was stored in VMS 104-B of independent mobile system 101-B. In FIG. 2, however, the MS 105-B is being served by independent mobile system 201 at the time a request is made for the voice message. To retrieve the voice message, the MS 105-B sends a request 211 for the voice message, which is received by the MSC 202 of the independent mobile system 201 currently serving the MS; the request is directed to the unique identifier code of the VMS 104-B of the independent mobile system 101-B which received the voice message. The request for the voice message (VM Request) is routed (212) from the MSC 202 of the independent mobile system 201 currently serving the MS 105-B to the VMS 104-B storing the voice message, which can then cause the voice message to be transmitted to the MS. As illustrated in FIG. 2, the VM Request is first routed (212) from the MSC 202 to the MSC 102-B, and then routed (213) from the MSC 102-B to the VMS 104-B.

In response to receiving the voice message request (213), the VMS 104-B transmits the voice message to MS 105-B. In one embodiment, the voice message is transmitted (214) to a Media Gateway (MGW) of the independent mobile system 101-B in which the message was stored, which then transmits the voice message to the MS 105-B through a MGW of the independent mobile system 201 then serving the MS. As illustrated in FIG. 2, the MGWs are physically-integrated with the MSCs of each independent mobile system; the MGWs, however, may be, or may be hosted by, separate physical entities.

Figure 3:
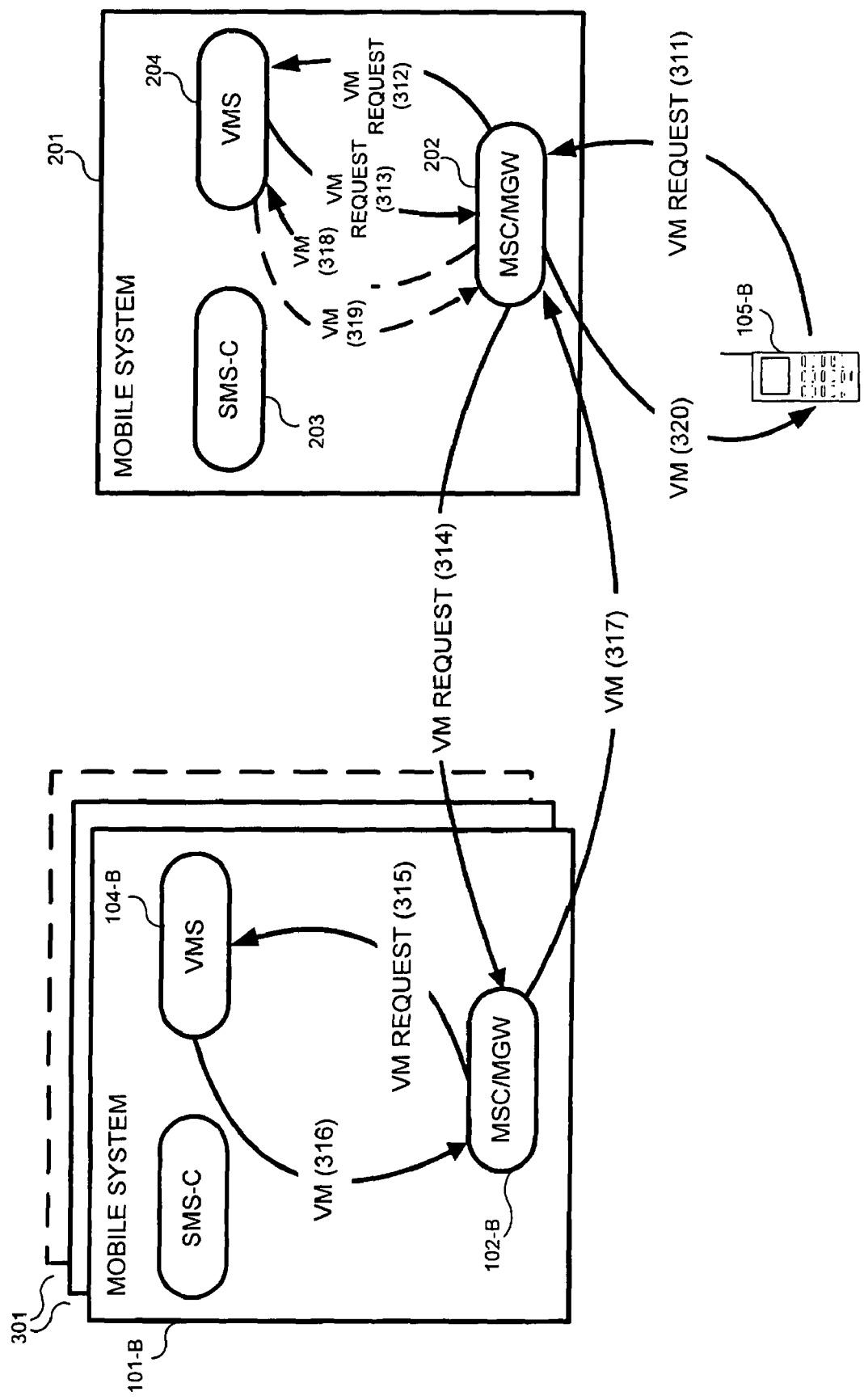

Finally, referring to FIG. 3, illustrated is second exemplary signalling related to the retrieval of a voice message by a MS when being served by any independent mobile system. In this embodiment, a MS can retrieve a plurality of voice messages stored by a plurality of VMSs when being served by any independent mobile system. In such embodiments, the MS 105-B sends a request for all voice messages (311), which is received by the MSC 202 of the independent mobile system 201 currently serving the MS; the request is directed to a common identifier code for voice messages. The voice message request is routed from the MSC 202 to the VMS 204 of that independent mobile system. The VMS 204 then requests each individual voice message for the MS 105-B stored on each VMS of all independent mobile systems in the communications network. Each voice message is then transmitted to the MS 105-B.

In order to manage the transmission of all voice messages stored by a plurality of VMSs, each VMS can include an indexing service that identifies each voice message stored on each VMS of all independent mobile systems in the communications network. The indexing service can catalog each voice message stored on each VMS of all independent mobile systems in the communications network by periodically polling each VMS or, alternatively, in response to automatically receiving updates from each VMS in the communication network.

Based on the contents of the index, the VMS 204 can cause the transmission of a voice message stored on the VMS 104-B of another independent mobile system 101-B by sending a voice message request to the remote VMS 104-B, which then routes the voice message to the MS 105-B. As illustrated in FIG. 3, the voice message request from VMS 204 is first routed (313) to MSC 202, then routed (314) to the MSC 102-B, and then routed (315) to the VMS 104-B. In response to receiving the voice message request (315), the VMS 104-B transmits the voice message to MS 105-B.

In one embodiment, the voice message is transmitted (316) to a Media Gateway (MGW) of the independent mobile system 101-B in which the message was stored, which then transmits the voice message to the MS 105-B through a MGW of the independent mobile system 201 then serving the MS. The voice message can be routed (317) from MGW 102-B to MGW 202, and then directly routed (320) to the MS 105-B. Alternatively, a voice message may be first routed (318) from MSC 202 to VMS 204, which can then control the routing (319) to MS 105-B through MGW 202.

The invention described herein modifies the standard user experience with voice mail where a single number is dialed to access the user's mailbox. The invention has the particular advantage of distributing voice mails across a group of independent mobile systems, thus avoiding a single point of failure. Failure of a single independent mobile system, or VMS, will only cause the loss of voice messages stored in that system; such a failure will not prevent new voice messages from being stored and retrieved as would be the case if all voice mails were stored on a centralized server. Furthermore, if a system or link outage is not permanent, a user will regain access to all stored voice messages without any manual configuration. Storing voice messages in multiple systems also allows a compact system to be built with low-cost, low capacity components that are better suited to rugged and mobile applications, such as military and disaster recovery deployments.

Although the invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed:

1. A method for providing a voice message to a user of a mobile station (MS) in a communications network having at least first and second independent mobile systems, each of said independent mobile systems including a Mobile Switching Center (MSC), Short Message Service Center (SMS-C) and Voice Message System (VMS), wherein each said VMS is identified by a unique identifier code, said method comprising the steps of:
   receiving a call request for a MS at a first MSC of first independent mobile system;
   routing said call request from said first MSC to said MS through a second MSC of a second independent mobile system, said second independent mobile system currently serving said second MS;
   if said second MS does not answer said call, storing a voice message in a Voice Mail System (VMS) of said first or second independent mobile system;
   requesting, by said VMS, that a Short Message Service Center (SMS-C) transmit an SMS notification message to said MS; and,
   transmitting, by said SMS-C, said SMS notification message to said MS through said second MSC, said SMS notification message including the unique identifier code of said VMS, whereby said second MS can retrieve said voice message by placing a call to said unique identifier code of said VMS when being served by any independent mobile system;
   wherein said MS can retrieve a plurality of voice messages stored by a plurality of VMSs when being served by any independent mobile system, said method further comprising the steps of:
   receiving a request from said MS, at an MSC of said any independent mobile system currently serving said MS, for all voice messages, said request directed to a common identifier code for voice messages;
   routing said request for said all voice messages from said MSC of said any independent mobile system currently serving said MS to a VMS of said any independent mobile system;
   requesting, by said VMS of said any independent mobile system currently serving said MS, each individual voice message for said MS stored on each VMS of all independent mobile systems in the communications network; and,
   transmitting each said individual voice message to said MS.

2. The method recited in claim 1, wherein said MS can retrieve said voice message when being served by any independent mobile system, said method further comprising the steps of:
   receiving a request for said voice message from said MS at an MSC of said any independent mobile system, said request directed to said unique identifier code of said VMS received in said SMS notification message;
   routing said request for said voice message from said MSC of said any independent mobile system to said VMS;
   receiving said request for said voice message at said VMS; and,
   transmitting said voice message from said VMS to said MS.

3. The method recited in claim 2, wherein said step of routing said request for said voice message from said MSC of said any independent mobile system to said VMS comprises the steps of:
   routing said request for said voice message from said MSC of said any independent mobile system to said first or second MSC of said first or second independent mobile system; and,
   routing said request for said voice message from said first or second MSC of said first or second independent mobile system to said VMS.

4. The method recited in claim 3, wherein said step of transmitting said voice message from said VMS to said MS comprises the steps of:
   transmitting said voice message to a Media Gateway (MGW) of said any independent mobile system; and,
   transmitting said voice message from said MGW of said any independent mobile system to said MS.

5. The method recited in claim 1, wherein the MSC, SMS-C and VMS of each said independent mobile system are physically co-located.

6. The method recited in claim 1, wherein said step of transmitting each said individual voice message to said MS comprises the steps of:
   receiving each said individual voice message at said VMS of said any independent mobile system currently serving said MS;
   transmitting each said individual voice message to a Media Gateway (MGW) of said any independent mobile system currently serving said MS; and,
   transmitting each said individual voice message to said MS from said MGW of said any independent mobile system currently serving said MS.

7. The method recited in claim 1, wherein said VMS of said any independent mobile system includes an indexing service that identifies each voice message for said MS stored on each VMS of all independent mobile systems in the communications network.

8. The method recited in claim 7, wherein said indexing service catalogs each voice message for said MS stored on each VMS of all independent mobile systems in the communications network by periodically polling each VMS.

9. The method recited in claim 7, wherein said indexing service catalogs each voice message for said MS stored on each VMS of all independent mobile systems in the communications network in response to automatically receiving updates from each VMS in the communication network.

10. A communications network operative to provide a voice message to a user of a mobile station (MS), said communications network comprising:
at least first and second independent mobile systems, each of said independent mobile systems including a Mobile Switching Center (MSC), Short Message Service Center (SMS-C) and Voice Message System (VMS), wherein each said VMS is identified by a unique identifier code, said communications network operative to:
receive a call request for a MS at a first MSC of a first independent mobile system;
route said call request from said first MSC to said second MS through a second MSC of a second independent mobile system, said second independent mobile system currently serving said MS;
if said second MS does not answer said call, store a voice message in a VMS of said first or second independent mobile system;
request, by said VMS, that a Short Message Service Center (SMS-C) transmit an SMS notification message to said MS; and,
transmit, by said SMS-C, said SMS notification message to said MS through said second MSC, said SMS notification message including the unique identifier code of said VMS of said second independent mobile system, whereby said MS can retrieve said voice message by placing a call to said unique identifier code of said VMS when being served by any independent mobile system;
wherein said MS can retrieve a plurality of voice messages stored by a plurality of VMSs when being served by any independent mobile stern said communications network further operative to:
receive a request from said MS, at an MSC of said any independent mobile system currently serving said MS, for all voice messages, said request directed to a common identifier code for voice messages;
route said request for said all voice messages from said MSC of said any independent mobile system currently serving said MS to a VMS of said any independent mobile system;
request, by said VMS of said any independent mobile system current serving said MS, each individual voice message for said second MS stored on each VMS of all independent mobile systems in the communications network; and,
transmit each said individual voice message to said MS.

11. The communications network recited in claim 10, wherein said MS can retrieve said voice message when being served by any independent mobile system, said communications network further operative to:
receive a request for said voice message from said MS at an MSC of said any independent mobile system, said request directed to said unique identifier code of said VMS;
route said request for said voice message from said MSC of said any independent mobile system to said VMS;
receive said request for said VM at said VMS; and,
transmit said voice message from said VMS to said MS.

12. The communications network recited in claim 11, wherein said communications network, when routing said request for said voice message from said MSC of said any independent mobile system to said VMS, is further operative to:
route said request for said voice message from said MSC of said any independent mobile system to said first or second MSC of said first or second independent mobile system; and,
route said request for said voice message from said first or second MSC of said first or second independent mobile system to said VMS.

13. The communications network recited in claim 12, wherein said communications network, when transmitting said voice message from said VMS, is further operative to:
transmit said voice message to a Media Gateway (MGW) of said any independent mobile system; and,
transmit said voice message from said MGW of said any independent mobile system to said MS.

14. The communications network recited in dam 10, wherein the MSC, SMS-C and VMS of each said independent mobile system are physically co-located.

15. The communications network recited in claim 10, wherein said communication network, when transmitting each said individual voice message to said MS, is further operative to:
receive each said individual voice message at said VMS of said any independent mobile system currently serving said MS;
transmit each said individual voice message to a Media Gateway (MGW) of said any independent mobile system currently serving said MS; and,
transmit each said individual voice message to said MS from said MGW of said any independent mobile system currently serving said MS.

16. The communications network recited in claim 10, wherein said VMS of said any independent mobile system includes an indexing service that identifies each voice message for said MS stored on each VMS of all independent mobile systems in the communications network.

17. The communications network recited in claim 16, wherein said indexing service catalogs each voice message for said MS stored on each VMS of all independent mobile systems in the communications network by periodically polling each VMS.

18. The communications network recited in claim 16, wherein said indexing service catalogs each voice message for said MS stored on each VMS of all independent mobile systems in the communications network in response to automatically receiving updates from each VMS in the communication network.

* * * * *

UNITED STATES PATENT AND TRADEMARK OFFICE
CERTIFICATE OF CORRECTION

| | | |
|---|---|---|
| PATENT NO. | : 8,099,083 B2 | Page 1 of 1 |
| APPLICATION NO. | : 11/839865 | |
| DATED | : January 17, 2012 | |
| INVENTOR(S) | : Ramachandran et al. | |

It is certified that error appears in the above-identified patent and that said Letters Patent is hereby corrected as shown below:

In Column 3, Line 48, delete "The" and insert -- the --, therefor.

In Column 5, Line 43, in Claim 1, delete "of" and insert -- of a --, therefor.

In Column 7, Line 41, in Claim 10, delete "stern" and insert -- system, --, therefor.

In Column 7, Line 53, in Claim 10, delete "current" and insert -- currently --, therefor.

In Column 8, Line 24, in Claim 13, delete "(MG W)" and insert -- (MGW) --, therefor.

In Column 8, Line 28, in Claim 14, delete "dam" and insert -- claim --, therefor.

Signed and Sealed this
Twentieth Day of March, 2012

David J. Kappos
*Director of the United States Patent and Trademark Office*